United States Patent
Wang et al.

(10) Patent No.: US 9,151,623 B2
(45) Date of Patent: Oct. 6, 2015

(54) METHOD AND APPARATUS FOR CONTROLLING AN ELECTRICAL DEVICE AND A WIRELESS CHARGING DEVICE

(71) Applicant: O2Micro Inc., Santa Clara, CA (US)

(72) Inventors: James Wang, San Jose, CA (US); Mei Yu, Chengdu (CN); Weihua Zhang, Chengdu (CN); Jinghua Zou, Chengdu (CN); Jun Wang, Chengdu (CN); Ke Gao, Chengdu (CN); Mao Liu, Shanghai (CN)

(73) Assignee: O2MICRO INC., Santa Clara, CA (US)

( * ) Notice: Subject to any disclaimer, the term of this patent is extended or adjusted under 35 U.S.C. 154(b) by 99 days.

(21) Appl. No.: 13/974,844

(22) Filed: Aug. 23, 2013

(65) Prior Publication Data

US 2015/0057928 A1 Feb. 26, 2015

(51) Int. Cl.
*G01C 21/00* (2006.01)
*H04B 1/034* (2006.01)
*G01C 21/20* (2006.01)
*H02J 7/02* (2006.01)

(52) U.S. Cl.
CPC ............... *G01C 21/20* (2013.01); *H02J 7/025* (2013.01)

(58) Field of Classification Search
CPC .................. G01C 21/20; H02J 7/025
See application file for complete search history.

(56) References Cited

U.S. PATENT DOCUMENTS

| | | | |
|---|---|---|---|
| 2010/0315389 A1 | 12/2010 | Sorrell et al. | |
| 2011/0148349 A1 | 6/2011 | Kim et al. | |
| 2012/0157044 A1* | 6/2012 | Kim et al. | ...... 455/410 |
| 2012/0214418 A1 | 8/2012 | Lee et al. | |
| 2012/0295634 A1* | 11/2012 | Kim | ...... 455/456.1 |
| 2013/0066400 A1* | 3/2013 | Perryman et al. | ...... 607/59 |
| 2013/0082662 A1* | 4/2013 | Carr et al. | ...... 320/134 |
| 2015/0028799 A1* | 1/2015 | Kwan et al. | ...... 320/108 |

FOREIGN PATENT DOCUMENTS

| | | |
|---|---|---|
| JP | H04265060 A | 9/1992 |
| JP | H05165588 A | 7/1993 |
| JP | 2006-79013 A | 3/2006 |
| JP | 2006209229 A | 8/2006 |
| JP | 2012-530402 A | 11/2012 |
| KR | 20070078769 A | 8/2007 |
| KR | 20110069264 A | 6/2011 |
| KR | 20120096864 A | 8/2012 |

OTHER PUBLICATIONS

Japanese Office Action dated Jul. 28, 2014 issued in Japanese Patent Application 2013-230061 (4 pages).
Korean Office Action dated Feb. 10, 2015 issued in Korean Patent Application 10-2013-0134287 (11 pages).

\* cited by examiner

*Primary Examiner* — Mary Cheung
(74) *Attorney, Agent, or Firm* — Pillsbury Winthrop Shaw Pittman LLP

(57) ABSTRACT

Method and apparatus for controlling an electrical device and a wireless charging device, each comprising one or more modules. An interrupt signal is received. A type of the interrupt signal is determined. A first module is activated based on the type of the interrupt signal to perform one or more functions. The electrical device and the wireless charging device share at least the first module.

25 Claims, 9 Drawing Sheets

METHOD AND APPARATUS FOR CONTROLLING AN ELECTRICAL DEVICE AND A WIRELESS CHARGING DEVICE

BACKGROUND

1. Technical Field

The disclosure relates generally to a method and apparatus for controlling an electrical device and a wireless charging device.

2. Discussion of Technical Background

Wireless power transmission is the transmission of electrical energy from a power source to an electrical load without interconnecting manmade conductors. The most common form of wireless power transmission is carried out using direct induction followed by resonant magnetic induction. Other methods include electromagnetic radiation in the form of microwaves or lasers and electrical conduction. Wireless power transmission has been used for battery charging, or other suitable loads, in a wide range of mobile devices, such as mobile phone, camera, music player, headset, etc.

An electrical device needs electric power to operate. A wireless charging device can provide electric power to an electrical device. However, a conventional electrical device, especially a wireless electrical device like a Global Positioning System (GPS) receiver, operates independently from a wireless charging device. While wireless charging devices and wireless electrical devices become more and more widely used, it is a waste of resource to have two independent devices, i.e., a wireless charging device and a wireless electrical device. It is inconvenient for a user to handle two separate devices, which are controlled by two different controlling units respectively.

Accordingly, there exists a need for controlling an electrical device and a wireless charging device without causing the issues mentioned above.

SUMMARY

The present disclosure describes methods, apparatus, and programming for controlling an electrical device and a wireless charging device.

In one exemplary embodiment, a method for controlling an apparatus including one or more modules is provided. An interrupt signal is received. A type of the interrupt signal is determined. A first module in the apparatus is activated based on the type of the interrupt signal to perform one or more functions. The apparatus comprises an electrical device and a wireless charging device. The electrical device and the wireless charging device share at least the first module.

In another exemplary embodiment, an apparatus including an electrical device, a wireless charging device, and a controlling unit is disclosed. Each of the electrical device, the wireless charging device, and the controlling unit includes one or more modules. The electrical device and the wireless charging device share at least one module. The controlling unit is coupled to the electrical device and the wireless charging device and comprises a monitoring module and an activating module. The monitoring module is configured to receive an interrupt signal and determine a type of the interrupt signal. The activating module is to the monitoring module and configured to activate a first module shared by the electrical device and the wireless charging device to perform one or more functions, based on the type of the interrupt signal.

In still another exemplary embodiment, a machine readable and non-transitory medium is provided that has information recorded thereon for controlling an apparatus having one or more modules. The information stored on the medium, when read by the machine, causes the machine to perform a series of steps, including receiving an interrupt signal and determining the type of the received interrupt signal. Subsequently, a first module in the apparatus is activated based on the type of the interrupt signal to perform one or more functions. The apparatus comprises an electrical device and a wireless charging device. The electrical device and the wireless charging device share at least the first module.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1:
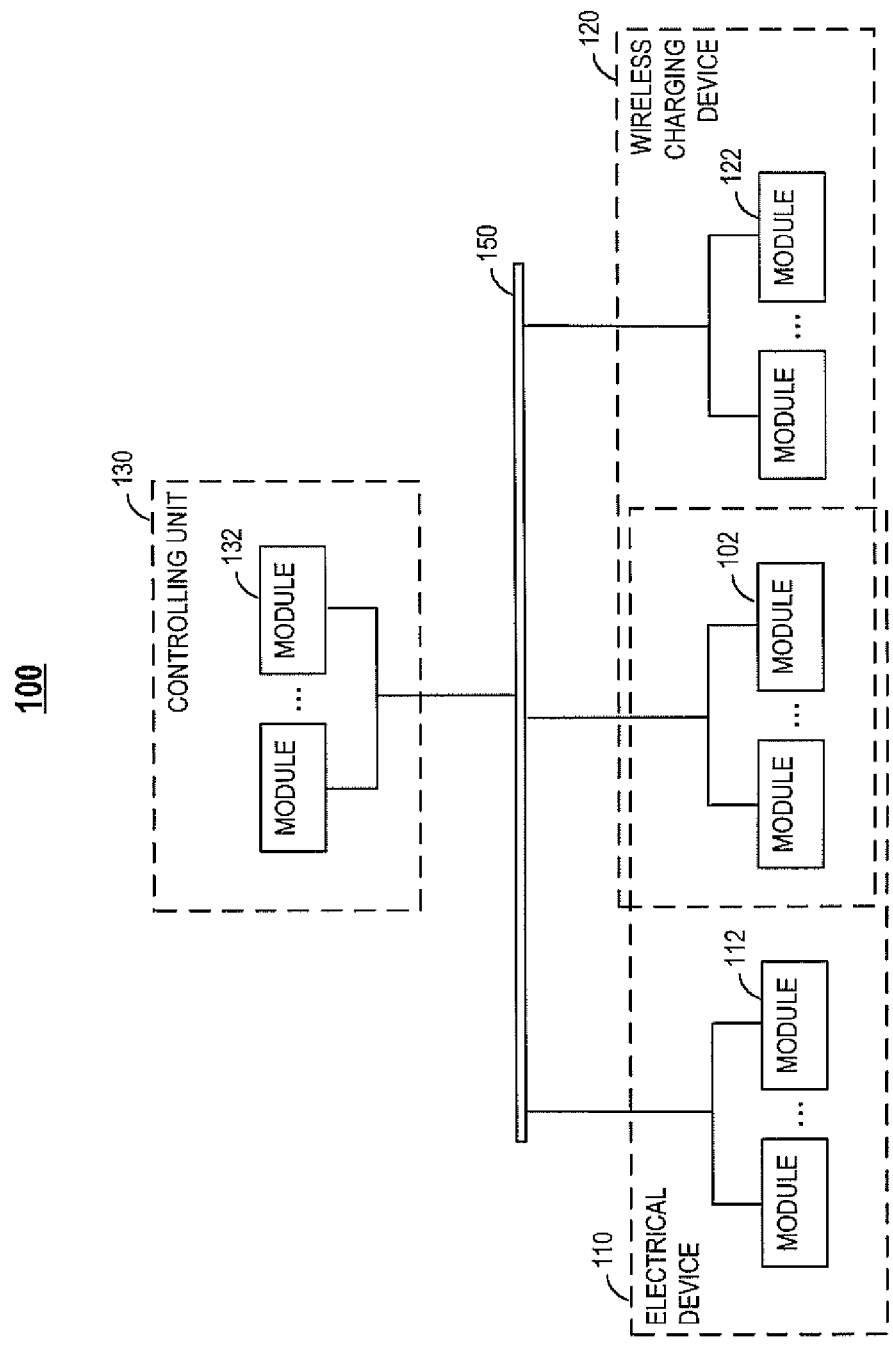
FIG. 1 is a block diagram illustrating an exemplary embodiment of an apparatus including an electrical device, a wireless charging device, and a controlling unit, in accordance with one embodiment of the present disclosure.

Reference will now be made in detail to the embodiments of the present disclosure, examples of which are illustrated in the accompanying drawings. While the present disclosure will be described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims.

In addition, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

Various embodiments in accordance with the present disclosure provide a method and apparatus for controlling an electrical device and a wireless charging device. More specifically, the electrical device and the wireless charging device may be controlled with a single controlling unit in an apparatus. Each of the electrical device and the wireless charging device has one or more modules. The electrical device and the wireless charging device in the apparatus share at least one module. The wireless charging device in the apparatus may comprise a wireless power transmitting module or a wireless power receiving module. The electrical device in the apparatus may comprise an electrical module needing electric power, e.g., a navigating module. While a description of a navigating module or a navigating receiver is used here for example, the method and apparatus disclosed are applicable to other electrical modules as well.

The method and apparatus disclosed herein may allow the apparatus to work as a single wireless power transmitter, a single wireless power receiver, or a single wireless navigating receiver. In addition, the method and apparatus disclosed herein may allow the apparatus to work as both a wireless power transmitter and a wireless navigating receiver. Further, the method and apparatus disclosed herein may allow the apparatus to work as both a wireless power receiver and a wireless navigating receiver. Depending on different working modes of the apparatus, different modules in the apparatus may be activated to perform one or more functions. Regardless of the working mode of the apparatus, one single controlling unit in the apparatus may control the electrical device and the wireless charging device, via interrupts assigned to different modules.

In one exemplary embodiment, the method and apparatus disclosed herein may allow a navigating module in the electrical device to work simultaneously with a wireless power transmitting module in the wireless charging device. In this exemplary embodiment, the apparatus operates both as a navigating receiver to receive navigation signals and as a wireless power transmitter to transmit electric power wirelessly to other apparatuses. At least one module shared by the electrical device and the wireless charging device may be activated in this exemplary embodiment to save resources. In another exemplary embodiment, the method and apparatus disclosed herein may allow a navigating module in the electrical device to work simultaneously with a wireless power receiving module in the wireless charging device. In this exemplary embodiment, the apparatus operates both as a navigating receiver to receive navigation signals and as a wireless power receiver to receive electric power wirelessly for charging the navigating receiver. At least one module shared by the electrical device and the wireless charging device may be activated in this exemplary embodiment to save resources.

Additional novel features will be set forth in part in the description which follows, and in part will become apparent to those skilled in the art upon examination of the following and the accompanying drawings or may be learned by production or operation of the examples.

FIG. 1 illustrates one exemplary embodiment of an apparatus 100 for controlling an electrical device and a wireless charging device, in accordance with one embodiment of the present disclosure. The apparatus 100 may be any suitable apparatus including an electrical device 110, a wireless charging device 120, and a controlling unit 130, in accordance with one embodiment of the present disclosure. The electrical device 110 may comprise one or more modules 112 to perform one or more functions in accordance with the electrical device 110. The wireless charging device 120 may also comprise one or more modules 122 to perform one or more functions in accordance with the wireless charging device 120. The electrical device 110 and the wireless charging device 120 may share one or more modules 102 to perform one or more functions in accordance with both the electrical device 110 and the wireless charging device 120. The controlling unit 130 may comprise one or more modules 132 to control the electrical device 110 and the wireless charging device 120 in the apparatus 100. The controlling unit 130 may comprise any type of central processing unit (CPU), including but not limited to, ARM or other single chip systems. In one exemplary embodiment, the apparatus 100 may include a bus 150, such as an Advanced Microcontroller Bus Architecture (AMBA) bus. The bus 150 connects to the modules 112 in the electrical device 110, the modules 122 in the wireless charging device 120, the modules 102 shared by the electrical device 110 and the wireless charging device 120, and the modules 132 in the controlling unit 130. The controlling unit 130 is coupled to the electrical device 110 and the wireless charging device 120 via the bus 150. The electrical device 110 and the wireless charging device 120 may be controlled together via the bus 150 by the controlling unit 130.

In this exemplary embodiment, the electrical device 110 may be any suitable electronic device, such as but is not limited to, a global positioning system (GPS), laptop computer, netbook computer, digital camera, digital camcorder, handheld device (e.g., dumb or smart phone, tablet, etc.), gaming console, set-top box, music player, or any other suitable device. In this exemplary embodiment, the wireless charging device 120 may comprise any suitable power transmitting module for wirelessly providing electric power to another apparatus. In other exemplary embodiments, the wireless charging device 120 may comprise any suitable power receiving module for wirelessly receiving electric power from another apparatus.

Figure 2:
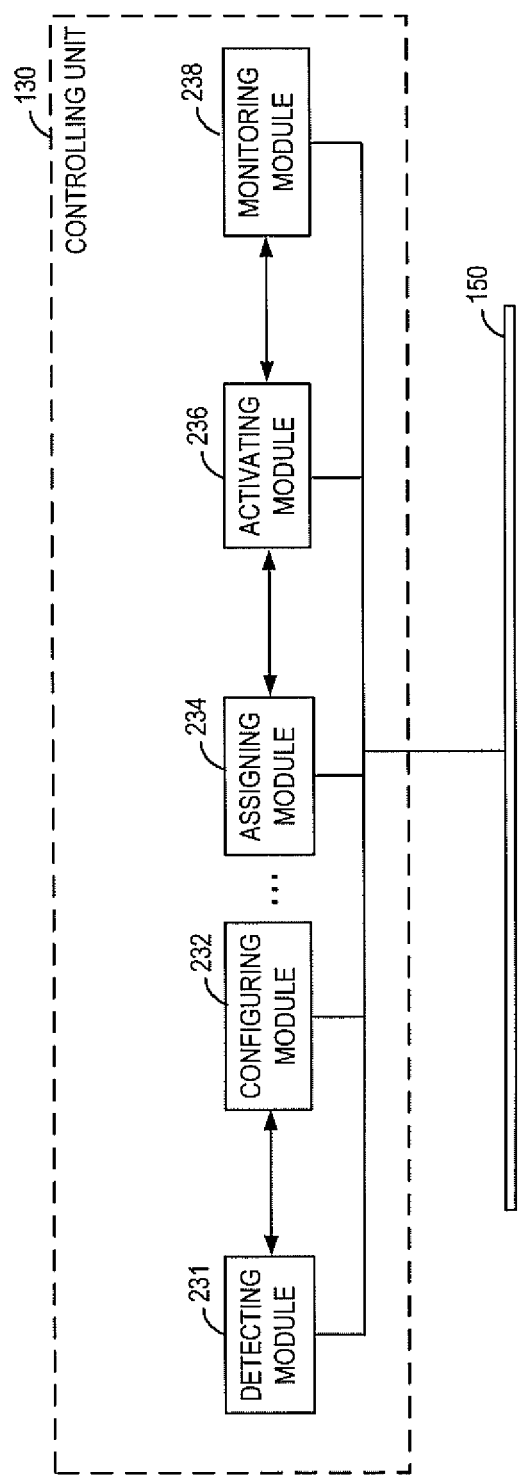
FIG. 2 is a block diagram illustrating an exemplary embodiment of the controlling unit shown in FIG. 1, in accordance with one embodiment of the present disclosure.

FIG. 2 illustrates an exemplary embodiment of the controlling unit 130, in accordance with one embodiment of the present disclosure. In this exemplary embodiment, the controlling unit 130 includes a detecting module 231, a configuring module 232, an assigning module 234, an activating module 236, and a monitoring module 238. In this exemplary embodiment, the monitoring module 238 is configured to receive an interrupt signal and determine a type of the interrupt signal. The interrupt signal may come from either the electrical device 110 or the wireless charging device 120. In this exemplary embodiment, the activating module 236 is coupled to the monitoring module 238 and configured to activate a first module shared by the electrical device 110 or the wireless charging device 120, based on the type of the interrupt signal. The first module may perform one or more functions upon being activated.

In this illustrated exemplary embodiment, the assigning module 234 is coupled to the activating module 236. The assigning module 234 may be configured to assign interrupts at each module in the electrical device 110 and the wireless charging device 120 before the first module is activated. The assigning module 234 may also be configured to assign one or more interrupts to each module in the electrical device 110 and the wireless charging device 120. The assigning module 234 may also be configured to assign a type of interrupt signal, a priority, and a time interval to each interrupt. The type of an interrupt signal may be used to determine which modules need to be activated upon receiving the interrupt signal. The priority for an interrupt may be used to determine whether this interrupt should be processed before or after another interrupt, if signals for both interrupts are received at the controlling unit 130. The time interval may be used to determine how often an interrupt is generated.

In some exemplary embodiments, the assigning module 234 may also be configured to re-assign interrupts at each module in the electrical device 110 and the wireless charging device 120 based on the one or more functions performed by the first module. The assigning module 234 may also be configured to re-assign one or more interrupts to each module in the electrical device 110 and the wireless charging device 120. The assigning module 234 may also be configured to re-assign a type of interrupt signal, a priority, and a time interval to each interrupt.

In some exemplary embodiments, the activating module 236 may further be configured to activate a second module in the apparatus 100 based on the type of the interrupt signal. The second module in these exemplary embodiments is not shared by the electrical device 110 and the wireless charging device 120. The second module in these exemplary embodiments may perform one or more functions upon being activated. The detecting module 231 may be configured to detect a current working mode of the apparatus 100. The configuring module 232 in this exemplary embodiment may be coupled to the detecting module 231 and configured to set up each module in the apparatus 100 based on the current working mode.

Figure 9:
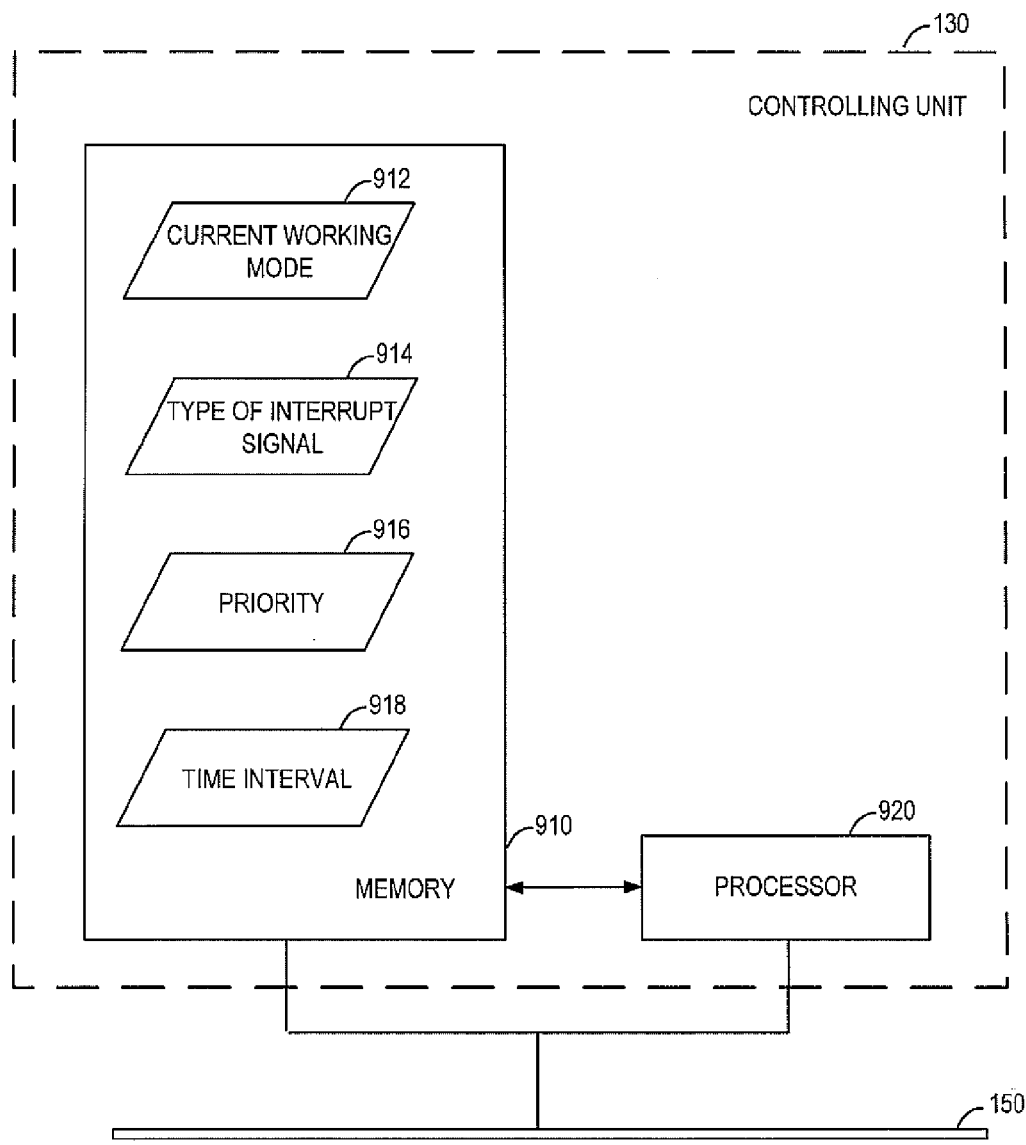
FIG. 9 is a block diagram illustrating an exemplary embodiment of a controlling unit in the apparatus shown in FIG. 1 including a processor and a memory, in accordance with one embodiment of the present disclosure.

In the embodiment shown in FIG. 9, the controlling unit 130 may be implemented by one or more processors 920 and memory 910. In this illustration, software programs and data may be loaded into the memory 910 and executed by the processor 920. The processor 920 may be any suitable processing unit, such as but not limited to, a microprocessor, a microcontroller, a central processing unit, an electronic control unit, etc. The memory 910 may be, for example, a discrete memory or a unified memory integrated with the processor 920. The data may include, for example, a current working mode 912 of the apparatus 100. The data may also include, for example, a type of interrupt signal 914, a priority 916, and a time interval 918 to each interrupt assigned in the apparatus 100.

Figure 3:
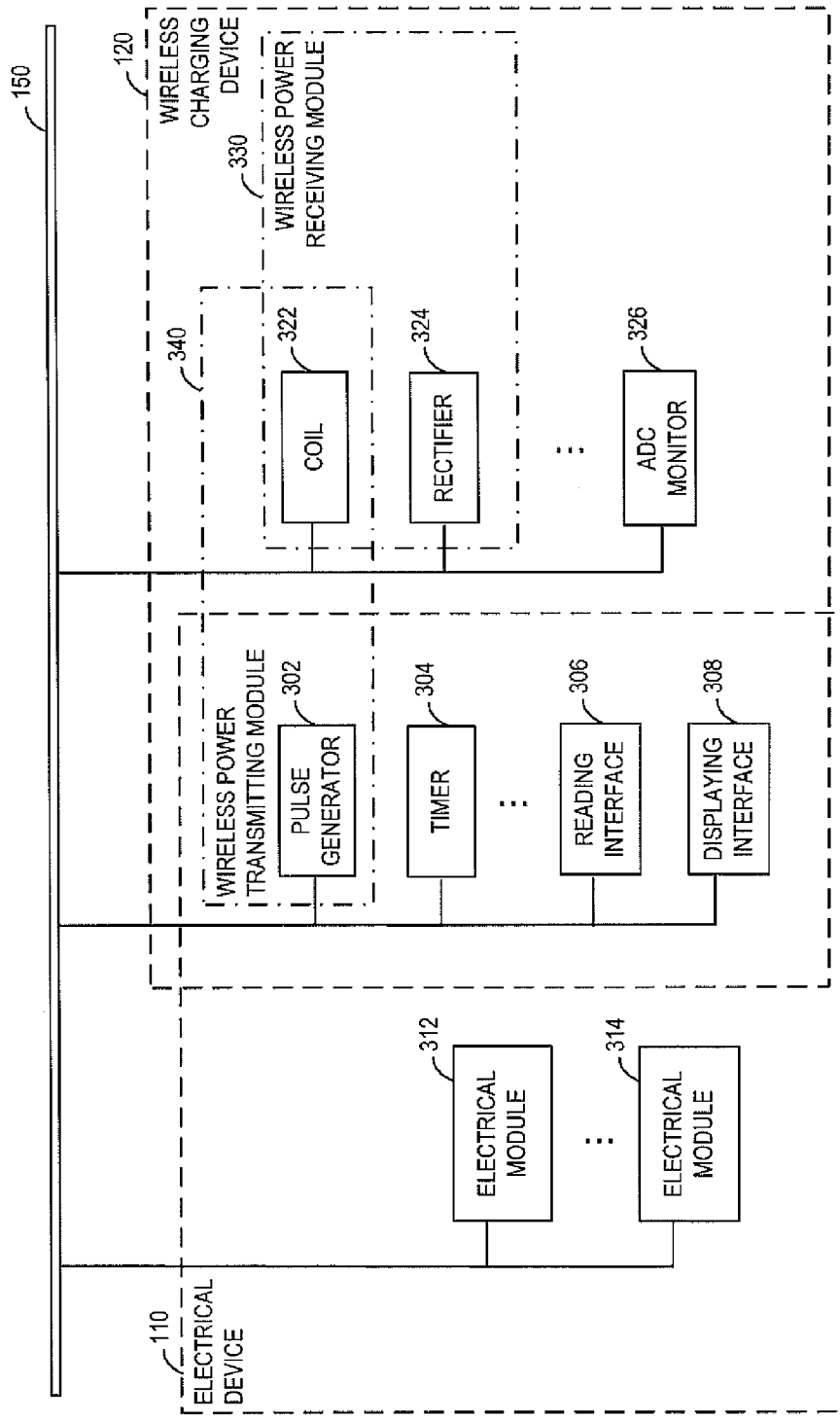
FIG. 3 is a block diagram illustrating an exemplary embodiment of the electrical device and the wireless charging device shown in FIG. 1, in accordance with one embodiment of the present disclosure.

FIG. 3 illustrates an exemplary embodiment of the electrical device 110 and the wireless charging device 120, in accordance with one embodiment of the present disclosure. In this exemplary embodiment, the electrical device 110 includes one or more electrical modules 312, 314. The electrical modules 312, 314 in this exemplary embodiment need electric power to operate. The wireless charging device 120 in this illustration may include a wireless power receiving module 330 configured to work simultaneously with one or more electrical modules 312, 314 in the electrical device 110. The wireless power receiving module 330 may include a coil 322 and a rectifier 324. In this exemplary embodiment, the coil 322 is responsible for receiving magnetic field by its resonant circuit and converting it to an AC voltage signal. The rectifier 324 is configured to convert the AC voltage signal to a DC voltage signal. In this exemplary embodiment, the wireless charging device 120 may also include an ADC monitor 326 configured to detect any suitable electrical parameter associated with a received electric power, e.g., voltage, current, or power.

In some embodiments, the wireless charging device 120 may comprise a wireless power transmitting module 340 configured to work simultaneously with one or more electrical modules 312, 314 in the electrical device 110. The wireless power transmitting module 340 may include a pulse generator 302 and a coil. The pulse generator 302 may be responsible for generating an AC voltage signal. The coil in the wireless power transmitting module 340 is responsible for converting an electric field of the AC voltage signal to a magnetic field and transmitting the magnetic field. In some exemplary embodiments, the wireless power receiving module 330 and the wireless power transmitting module 340 may share the coil 322, which may be responsible for receiving and transmitting a magnetic field by its resonant circuit, and for converting between an electric field of an AC voltage signal and the magnetic field.

Further in this embodiment, the electrical device 110 and the wireless charging device 120 may share one or more modules, including but not limited to, the pulse generator 302, a timer 304, a reading interface 306, and a displaying interface 308. The timer 304 may be responsible for controlling generation of interrupt signals in accordance with a fixed time interval or for querying timing of the controlling unit 130. The reading interface 306 may be responsible for reading and configuring data received from outside the apparatus 100. In accordance with various embodiments, the reading interface 306 may be based on Serial Peripheral Interface (SPI) or Universal Asynchronous Receiver/Transmitter (UART). The displaying interface 308 may be responsible for displaying instructions or commands. In accordance with various embodiments, the displaying interface 308 may be based on a General Purpose Input/Output (GPIO).

The apparatus 100 in this embodiment may operate at various working modes. At one working mode, the electrical device 110 works simultaneously with the wireless power transmitting module 340. At this working mode, all modules in the electrical device 110, including modules shared by the electrical device 110 and the wireless charging device 120, may be activated to perform one or more functions. At another working mode, the electrical device 110 works simultaneously with the wireless power receiving module 330. At this working mode, all modules in the electrical device 110, including modules shared by the electrical device 110 and the wireless charging device 120, may be activated to perform one or more functions. At both working modes, all working modules are connected to bus 150 in the apparatus 100. When multiple modules work simultaneously in the apparatus 100, the controlling unit 130 in the apparatus 100 may control the working modules together by processing, at different time slots, interrupt signals received from the working modules via bus 150.

Figure 4:
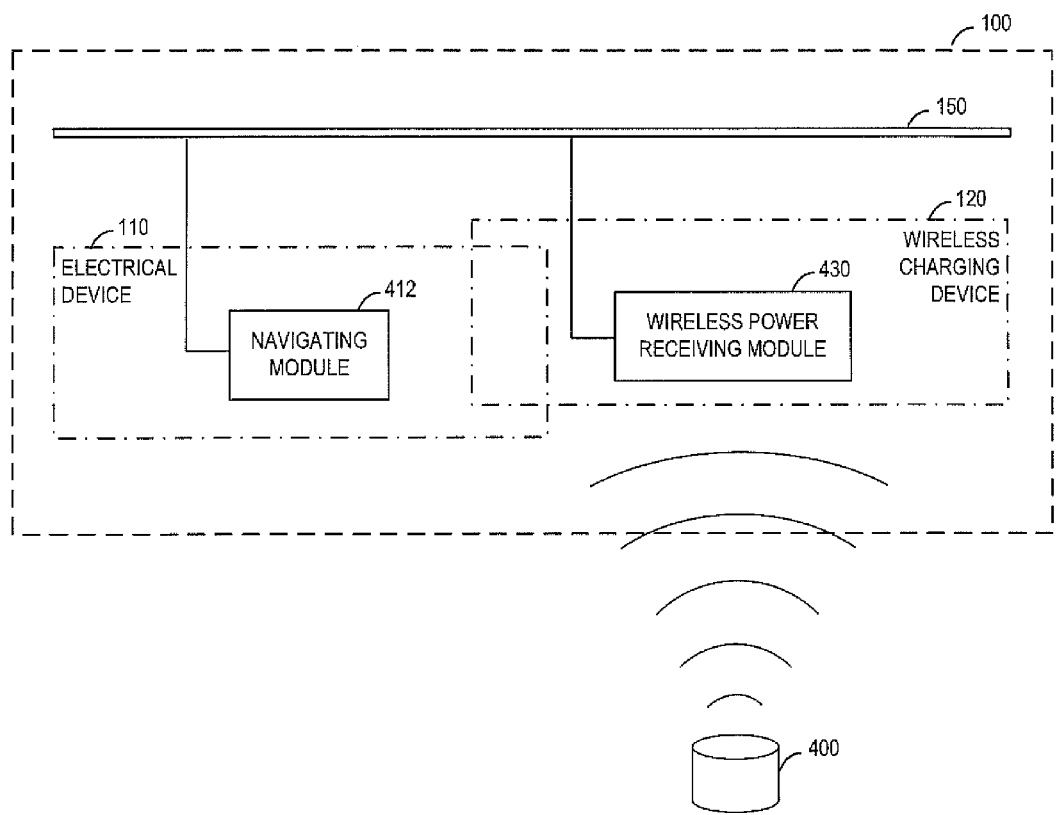
FIG. 4 is a block diagram illustrating an exemplary embodiment of a system for an electrical device and a wireless charging device to work simultaneously, in accordance with one embodiment of the present disclosure.

FIG. 4 is a block diagram illustrating an exemplary embodiment of a system for the electrical device 110 and the wireless charging device 120 to work simultaneously, in accordance with one embodiment of the present disclosure. In this exemplary embodiment, the apparatus 100 has a current working mode for wirelessly navigating and wirelessly receiving power. The electrical device 110 in this exemplary embodiment includes a navigating module 412 as an electrical module. The wireless charging device 120 in this exemplary embodiment includes a wireless power receiving module 430. The apparatus 100 is configured to wirelessly navigate using the navigating module 412 and receive power using the wireless power receiving module 430 at the same time. The power received at the wireless power receiving module 430 may be transmitted wirelessly from a transmitting apparatus 400. The transmitting apparatus 400 may be any suitable wireless power transmitter, including but not limited to, a wireless charging station. The power received at the wireless power receiving module 430 may be used to charge the navigating module 412. The pulse generator 302 may be configured to output communication signals for the wireless power receiving module 430, and generate a pulse signal at 1 pps for the navigating module.

In this exemplary embodiment, a method for controlling the electrical device 110 and the wireless charging device 120 is provided. The current working mode for wirelessly navigating and wirelessly receiving power is detected. Accordingly, various interrupts are then assigned in the apparatus 100. In the electrical device 110, assigned interrupts include an interrupt for regularly reading data and status of navigation, an interrupt for singular calculation, etc. In the wireless charging device 120, assigned interrupts include an interrupt for regularly sending data packets, an interrupt for too high temperature, an interrupt for too high electric current, etc. The apparatus 100 enters an idle state after each working module is assigned an interrupt. If the monitoring module 238 receives a signal of an interrupt for too high electric current, the activating module 236 may activate the displaying interface 308 (e.g., GPIO) and the coil 322. An indication light may be turned on. A data packet may be sent to indicate a too high electric current. Then, various interrupts may be re-assigned in the apparatus 100. For example, the assigning module 234 in the apparatus 100 may re-assign a time interval of the interrupt for regularly sending data packets indicating a too high electric current. If the monitoring module 238 receives a signal of an interrupt for regularly reading data and status of navigation, the activating module 236 may activate the reading interface 306 (e.g., UART) to read data of navigation. The pulse generator 302 may be activated to generate and send a pulse signal at 1 pps. The displaying interface 308 (e.g., GPIO) may be activated to output an indication signal. Then, various interrupts may be re-assigned in the apparatus 100. For example, the assigning module 234 in the apparatus 100 may re-assign a priority of the interrupt for regularly reading data and status of navigation.

Figure 5:
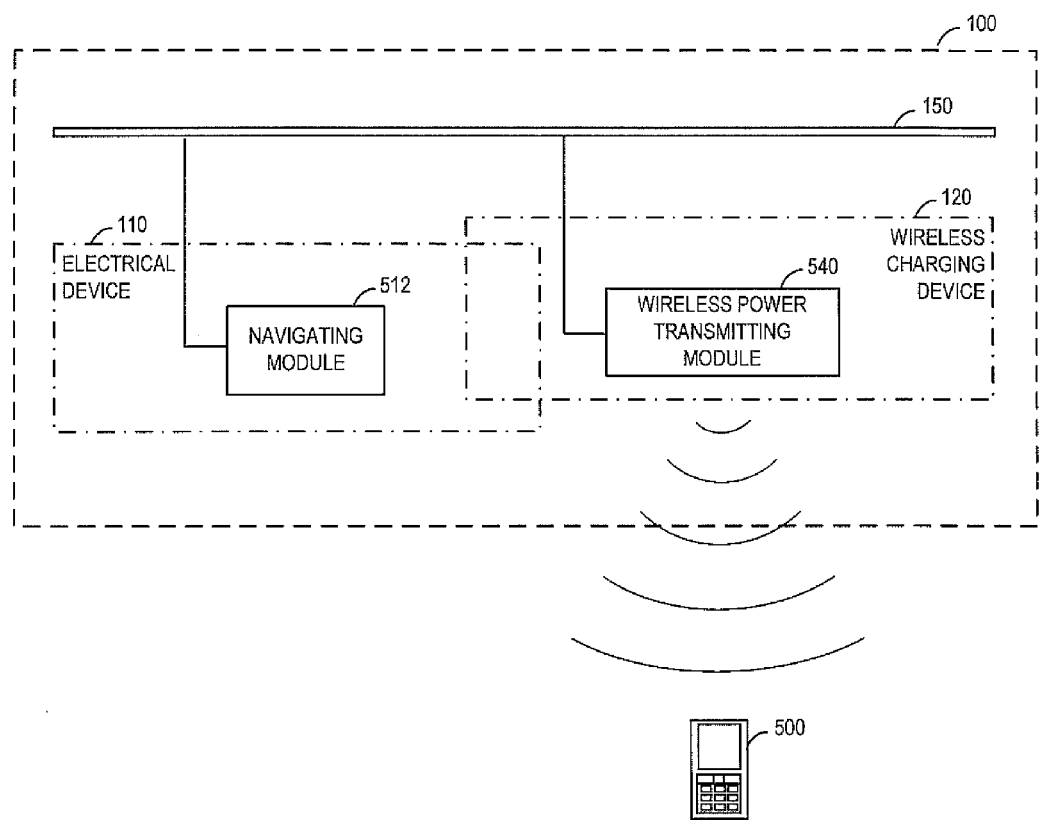
FIG. 5 is a block diagram illustrating an exemplary embodiment of another system for an electrical device and a wireless charging device to work simultaneously, in accordance with one embodiment of the present disclosure.

FIG. 5 depicts an exemplary block diagram for the electrical device 110 and the wireless charging device 120, in accordance with one embodiment of the present disclosure. In this exemplary embodiment, the apparatus 100 has a current working mode for wirelessly navigating and wirelessly transmitting power. The electrical device 110 in this exemplary embodiment includes a navigating module 512 as an electrical module. The wireless charging device 120 in this exemplary embodiment includes a wireless power transmitting module 540. The apparatus 100 is configured to wirelessly navigate using the navigating module 512 and transmit power using the wireless power transmitting module 540 at the same time. The wireless power transmitting module 540 may transmit power wirelessly to a receiving apparatus 500. The receiving apparatus 500 may be any suitable wireless power receiver, including but not limited to, a smart cell phone and an MP3 player. In this exemplary embodiment, the pulse generator 302 may be configured to generate control signals, e.g., an invert signal, for the wireless power transmitting module 540, and generate a pulse signal at e.g., 1 pps for the navigating module.

Figure 6:
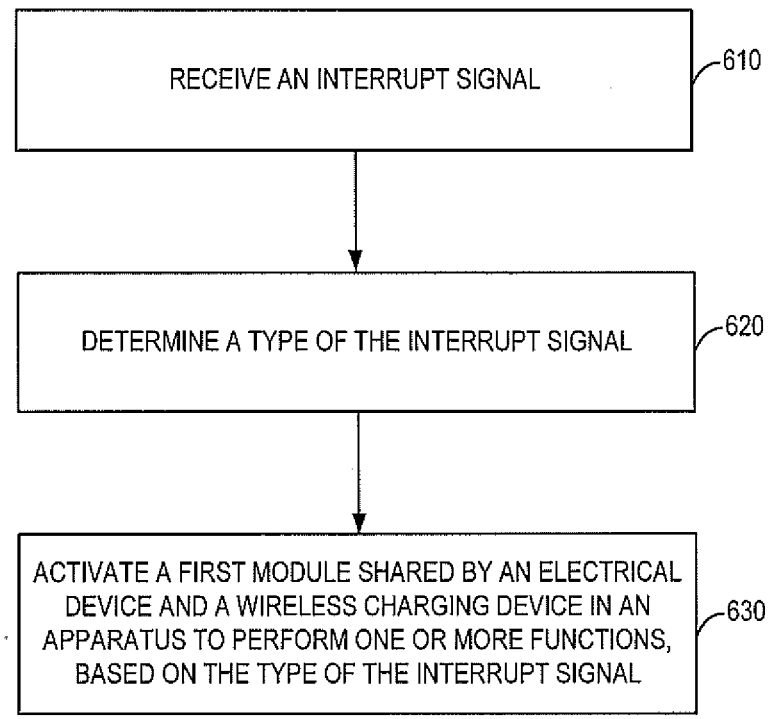
FIG. 6 is a flow chart illustrating an exemplary embodiment of a method for controlling an electrical device and a wireless charging device, in accordance with one embodiment of the present disclosure.

FIG. 6 is a flowchart of an exemplary process to control the electrical device 110 and the wireless charging device 120, in accordance with one embodiment of the present disclosure. Beginning at 610, an interrupt signal is received from either the electrical device 110 or the wireless charging device 120. Proceeding to 620, a type of the interrupt signal is determined. As described above, 610 and 620 may be performed by, e.g., the monitoring module 238 of the controlling unit 130. Moving to 630, a first module in the apparatus 100 is activated based on the type of the interrupt signal to perform one or more functions. The first module is shared by the electrical device 110 and the wireless charging device 120. As described above, 630 may be performed by, e.g., e.g., the activating module 236 of the controlling unit 130.

Figure 7:
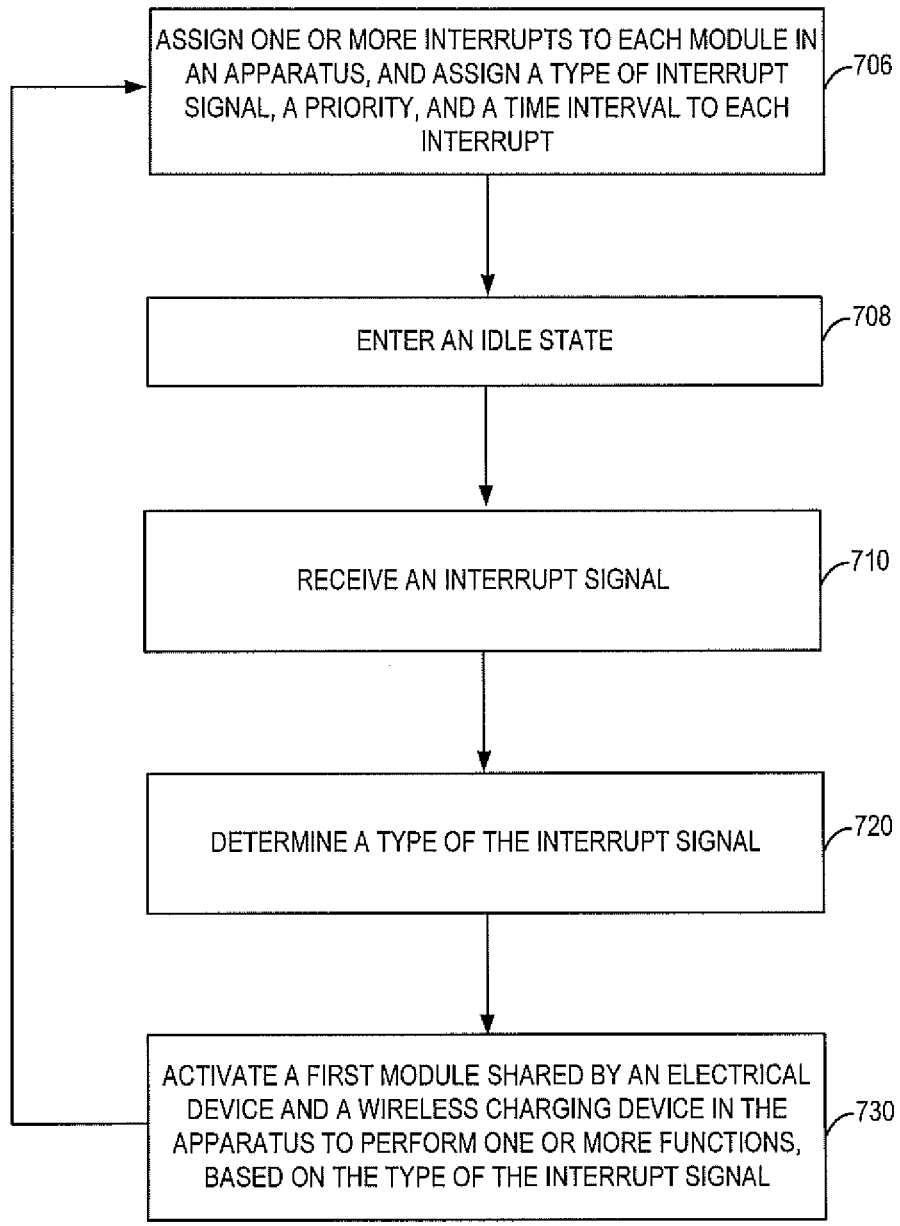
FIG. 7 is a flow chart illustrating another exemplary embodiment of a method for controlling an electrical device and a wireless charging device, in accordance with one embodiment of the present disclosure.

FIG. 7 is a flowchart of another exemplary process to control the electrical device 110 and the wireless charging device 120, in accordance with one embodiment of the present disclosure. Beginning at 706, one or more interrupts are assigned to each module in the apparatus 100. Each of the interrupts is assigned a type of an interrupt signal, a priority, and a time interval. The type of an interrupt signal may be used to determine which modules need to be activated upon receiving the interrupt signal. The priority for an interrupt may be used to determine whether this interrupt should be processed before or after another interrupt at the controlling unit 130, if signals for both interrupts are received at the controlling unit 130. In one exemplary embodiment, the interrupt with higher priority is processed before the interrupt with lower priority. The time interval may be used to determine how often an interrupt is generated. In one situation, the time interval may be assigned based on a known standard. For example, the time interval of an interrupt for regularly sending data packets in the wireless charging device 120 may be assigned based on QI communication protocol (Wireless Power Consortium). In another situation, the time interval may be assigned based on corresponding states and functions. For example, the time interval of an interrupt for regularly reading data and status of navigation in the electrical charging device 110 may be assigned based on whether the apparatus is in a debugging state and a maximum speed the data interface can support. As described above, 706 may be performed by, e.g., the assigning module 234 of the controlling unit 130.

The apparatus 100 then optionally enters an idle state at 708. Moving to 710, an interrupt signal is received from either the electrical device 110 or the wireless charging device 120. Proceeding to 720, a type of the interrupt signal is determined. As described above, 710 and 720 may be performed by, e.g., the monitoring module 238 of the controlling unit 130. Moving to 730, a first module in the apparatus 100 is activated based on the type of the interrupt signal to perform one or more functions. The first module is shared by the electrical device 110 and the wireless charging device 120. As described above, 730 may be performed by, e.g., the activating module 236 of the controlling unit 130. Then moving back to 706, interrupts may be assigned again at each module in the apparatus 100, based on the one or more functions performed by the first module. For example, a priority or a time interval for some interrupts may be re-assigned to a higher or lower value. This may again be performed by, e.g., the assigning module 234 of the controlling unit 130.

Figure 8:
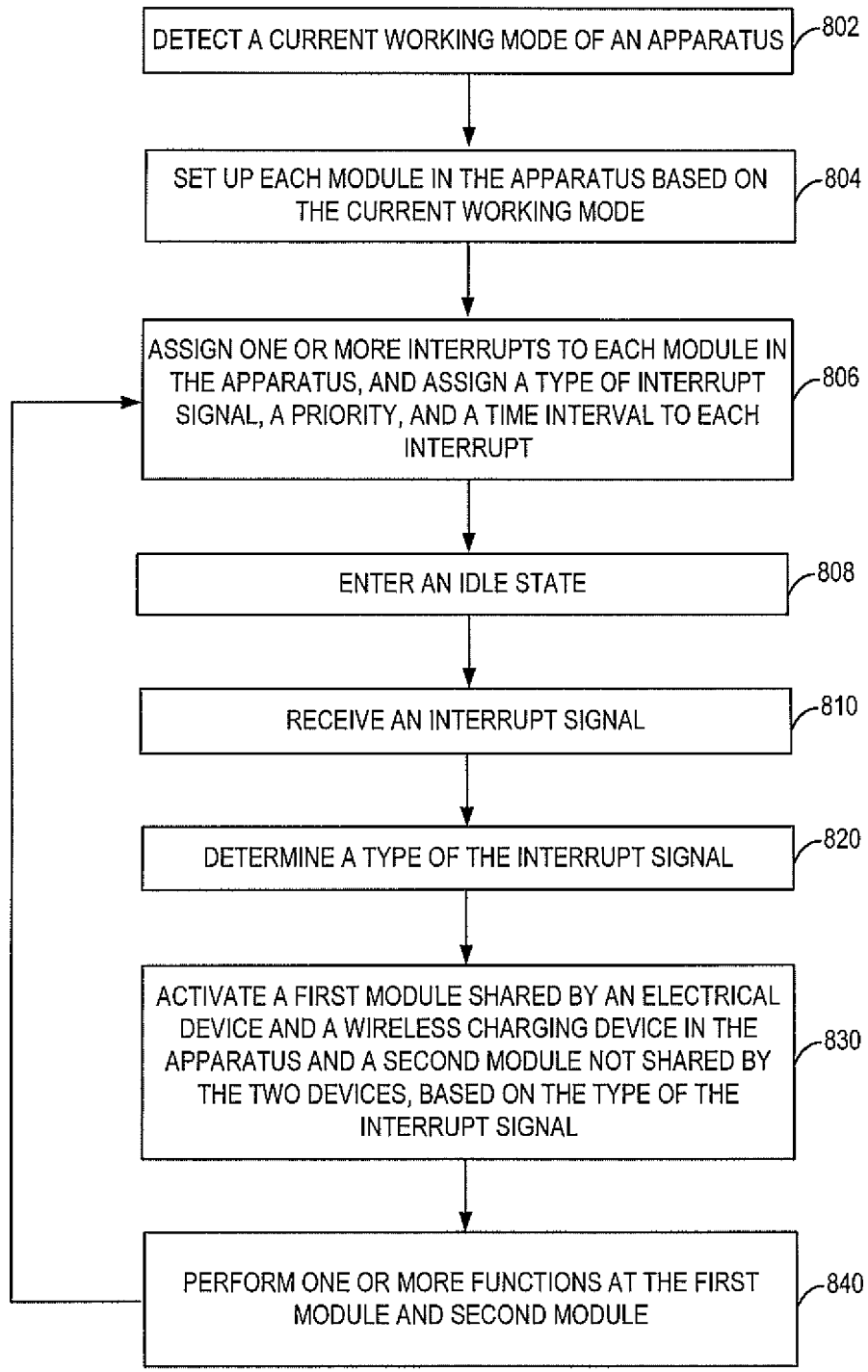
FIG. 8 is a flow chart illustrating still another exemplary embodiment of a method for controlling an electrical device and a wireless charging device, in accordance with one embodiment of the present disclosure.

FIG. 8 is yet another flowchart of an exemplary process to control the electrical device 110 and the wireless charging device 120, in accordance with one embodiment of the present disclosure. Beginning at 802, a current working mode of the apparatus 100 is detected. In this exemplary process, the current working mode may be a single wireless power transmitter, a single wireless power receiver, a single navigating device, a wireless power transmitter plus a navigating device, or a wireless power receiver plus a navigating device. As described above, this may be performed by, e.g., the detecting module 231 of the controlling unit 130. Moving to 804, each module in the apparatus 100 is set up based on the current working mode. As described above, this may be performed by, e.g., the configuring module 232 of the controlling unit 130. Proceeding to 806, one or more interrupts are assigned to each module in the apparatus 100. Each of the interrupts is assigned a type of interrupt signal, a priority, and a time interval. As described above, this may be performed by, e.g., the assigning module 234 of the controlling unit 130. The apparatus 100 then optionally enters an idle state at 808. Moving to 810, an interrupt signal is received from either the electrical device 110 or the wireless charging device 120. Proceeding to 820, a type of the interrupt signal is determined. As described above, 810 and 820 may be performed by, e.g., the monitoring module 238 of the controlling unit 130. Moving to 830, both a first module and a second module in the apparatus 100 are activated based on the type of the interrupt signal to perform one or more functions. The first module may be shared by the electrical device 110 and the wireless charging device 120. The second module may not be shared by the electrical device 110 and the wireless charging device 120. In accordance with various embodiments, modules other than the first and second modules may be activated. As described above, 830 may be performed by, e.g., the activating module 236 of the controlling unit 130. At 840, the first module and the second module in the apparatus 100 both perform one or more functions. Then moving back to 806, interrupts may be assigned again at each module in the apparatus 100, based on the one or more functions performed by the first module and the second module. This may again be performed by, e.g., the assigning module 234 of the controlling unit 130.

Aspects of the method for controlling an electrical device and a wireless charging device, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the computer-implemented method.

All or portions of the computer-implemented method may at times be communicated through a network such as the Internet or various other telecommunication networks. Such communications, for example, may enable loading of the software from one computer or processor into another. Thus, another type of media that may bear the elements of the computer-implemented method includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the computer-implemented method. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present disclosure is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

While the foregoing description and drawings represent embodiments of the present disclosure, it will be understood that various additions, modifications, and substitutions may be made therein without departing from the spirit and scope of the principles of the present disclosure as defined in the accompanying claims. One skilled in the art will appreciate that the present disclosure may be used with many modifications of form, structure, arrangement, proportions, materials, elements, and components and otherwise, used in the practice of the disclosure, which are particularly adapted to specific environments and operative requirements without departing from the principles of the present disclosure. The presently disclosed embodiments are therefore to be considered in all respects as illustrative and not restrictive, the scope of the present disclosure being indicated by the appended claims and their legal equivalents, and not limited to the foregoing description.

What is claimed is:

1. A method for controlling an apparatus including one or more modules, comprising the steps of:
receiving an interrupt signal;
determining a type of the interrupt signal; and
activating a first module in the apparatus based on the type of the interrupt signal to perform one or more functions, wherein
the apparatus comprises an electrical device and a wireless charging device, and
the electrical device and the wireless charging device share at least the first module.

2. The method of claim 1, wherein:
the wireless charging device comprises a wireless power receiving module; and
the electrical device comprises an electrical module configured to work simultaneously with the wireless power receiving module.

3. The method of claim 2, wherein:
the electrical module is a navigating module; and
the apparatus is configured to wirelessly navigate and receive power at the same time.

4. The method of claim 1, wherein:
the wireless charging device comprises a wireless power transmitting module; and the electrical device comprises an electrical module configured to work simultaneously with the wireless power transmitting module.

5. The method of claim 4, wherein:
the electrical module is a navigating module; and
the apparatus is configured to wirelessly navigate and transmit power at the same time.

6. The method of claim 1, further comprising the steps of:
assigning interrupts at each module in the apparatus before the step of activating; and
re-assigning interrupts at each module based on the one or more functions performed by the first module.

7. The method of claim 6, wherein the step of assigning interrupts further comprises:
assigning one or more interrupts to each module; and
assigning a type of interrupt signal, a priority, and a time interval to each interrupt.

8. The method of claim 6, wherein the step of re-assigning interrupts further comprises:
re-assigning one or more interrupts to each module; and
re-assigning a type of interrupt signal, a priority, and a time interval to each interrupt.

9. The method of claim 1, further comprising activating a second module in the apparatus based on the type of the interrupt signal to perform one or more functions, wherein the second module is not shared by the electrical device and the wireless charging device.

10. The method of claim 1, further comprising the steps of:
detecting a current working mode of the apparatus; and
setting up each module in the apparatus based on the current working mode.

11. An apparatus comprising:
an electrical device including one or more modules;
a wireless charging device including one or more modules, wherein the electrical device and the wireless charging device share at least one module; and
a controlling unit coupled to the electrical device and the wireless charging device, comprising:
a monitoring module configured to:
receive an interrupt signal, and
determine a type of the interrupt signal, and
an activating module coupled to the monitoring module and configured to activate a first module shared by the electrical device and the wireless charging device to perform one or more functions, based on the type of the interrupt signal.

12. The apparatus of claim 11, wherein:
the wireless charging device comprises a wireless power receiving module; and
the electrical device comprises an electrical module configured to work simultaneously with the wireless power receiving module.

13. The apparatus of claim 12, wherein:
the electrical module is a navigating module; and
the apparatus is configured to wirelessly navigate and receive power at the same time.

14. The apparatus of claim 11, wherein:
the wireless charging device comprises a wireless power transmitting module; and
the electrical device comprises an electrical module configured to work simultaneously with the wireless power transmitting module.

15. The apparatus of claim 14, wherein:
the electrical module is a navigating module; and
the apparatus is configured to wirelessly navigate and transmit power at the same time.

16. The apparatus of claim 11, wherein the controlling unit further comprises an assigning module coupled to the activating module and configured to:
assign interrupts at each module in the electrical device and the wireless charging device before the first module is activated; and
re-assign interrupts at each module based on the one or more functions performed by the first module.

17. The apparatus of claim 16, wherein the assigning module is further configured to:
assign one or more interrupts to each module in the electrical device and the wireless charging device; and
assign a type of interrupt signal, a priority, and a time interval to each interrupt.

18. The apparatus of claim 16, wherein the assigning module is further configured to:
re-assign one or more interrupts to each module in the electrical device and the wireless charging device; and
re-assign a type of interrupt signal, a priority, and a time interval to each interrupt.

19. The apparatus of claim 11, wherein
the activating module is further configured to activate a second module in the apparatus based on the type of the interrupt signal to perform one or more functions; and
the second module is not shared by the electrical device and the wireless charging device.

20. The apparatus of claim 11, wherein the controlling unit further comprises:
a detecting module configured to detect a current working mode of the apparatus; and
a configuring module configured to set up each module in the apparatus based on the current working mode.

21. A machine-readable tangible and non-transitory medium having information for controlling an apparatus, wherein the information, when read by the machine, causes the machine to perform the following steps:
receiving an interrupt signal;
determining a type of the interrupt signal; and
activating a first module in the apparatus based on the type of the interrupt signal to perform one or more functions, wherein
the apparatus comprises an electrical device and a wireless charging device, and
the electrical device and the wireless charging device share at least the first module.

22. The medium of claim 21, wherein:
the wireless charging device comprises a wireless power receiving module; and
the electrical device comprises an electrical module configured to work simultaneously with the wireless power receiving module.

23. The medium of claim 22, wherein:
the electrical module is a navigating module; and
the apparatus is configured to wirelessly navigate and receive power at the same time.

24. The medium of claim 21, wherein:
the wireless charging device comprises a wireless power transmitting module; and
the electrical device comprises an electrical module configured to work simultaneously with the wireless power transmitting module.

25. The medium of claim 24, wherein:
the electrical module is a navigating module; and
the apparatus is configured to wirelessly navigate and transmit power at the same time.

* * * * *